Patented July 31, 1951

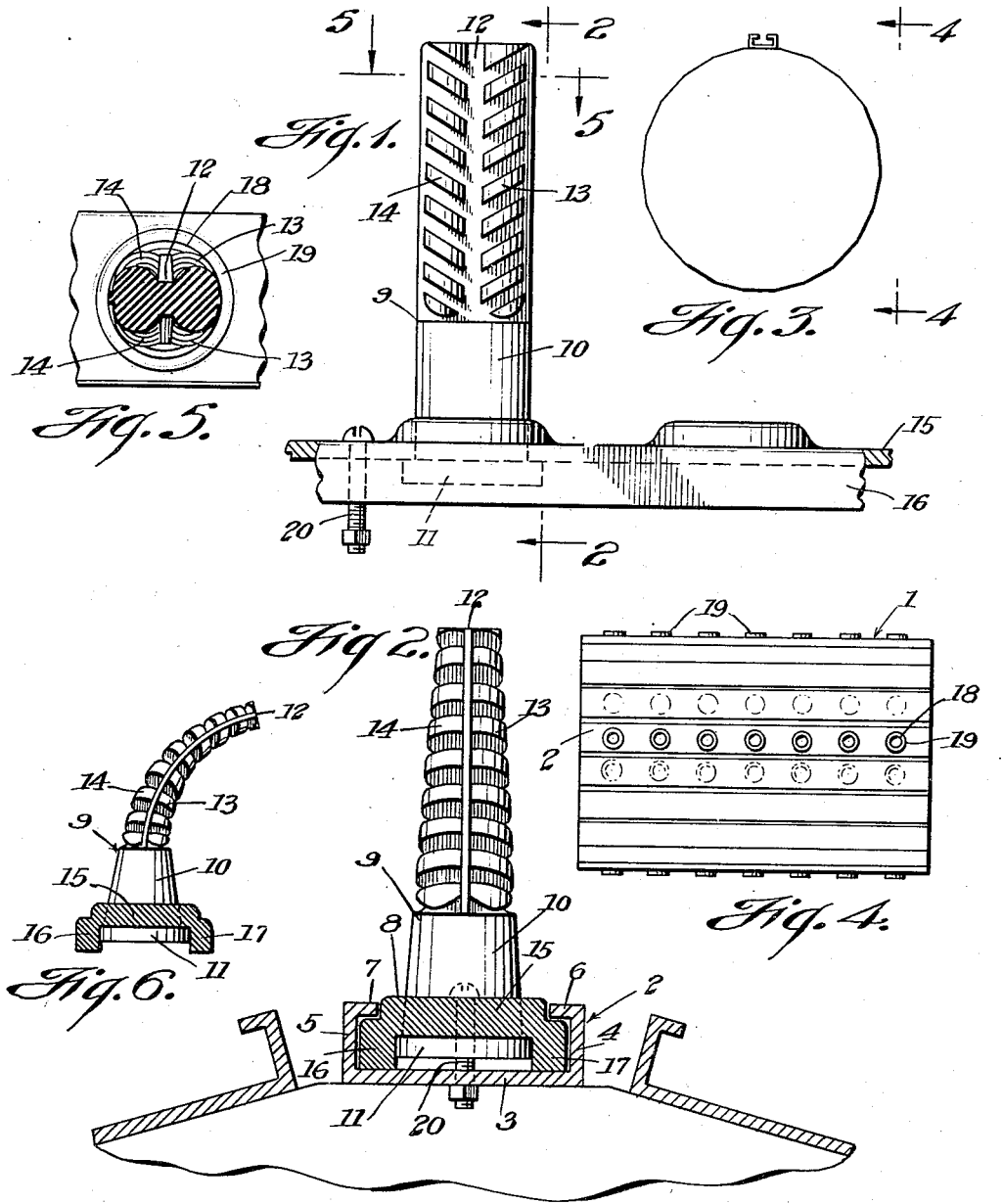

2,562,681

UNITED STATES PATENT OFFICE 2,562,681

POULTRY PICKER FINGER

Jacob Pine, Alhambra, Calif.

Application May 2, 1947, Serial No. 745,531

5 Claims. (Cl. 17—11.1)

The present invention relates to poultry pickers of the type which includes a drum provided with projecting fingers, the drum adapted to be rotated by a motor. The poultry is held so as to bring the fingers into engagement with the feathers during rotation of the drum, the fingers stripping the feathers from the body.

The present invention relates more specifically to a finger so constructed as to remove feathers from the fowl rapidly and without causing any barking of the skin or any loss of picking efficiency.

A further object is the provision of a picking finger so constructed as to grip the feathers rather than merely rub against the feathers.

A further object includes an efficiency means for mounting the fingers on a drum.

A further object is a picking device which permits the entire surface of the picking fingers to be used.

Other objects include a poultry picker which is inexpensive in cost to manufacture, efficient in operation and generally superior to devices now known to the inventor.

With the above mentioned and other objects in view, the invention consists in the novel and useful provision, formation, construction, association and relative arrangement of parts, members and features, all as shown in one embodiment in the accompanying drawing, described generally and more particularly pointed out in the claims.

In the drawing:

Fig. 1 is a fragmentary side elevation, partly in section, of a drum incorporating a picking finger of the invention;

Fig. 2 is a sectional view on the line 2—2 of Fig. 1;

Fig. 3 is a detail of the drum, looking toward one end thereof;

Fig. 4 is a view looking in the direction of the arrows 4—4 of Fig. 3;

Fig. 5 is a fragmentary sectional view on the line 5—5 of Fig. 1; and

Fig. 6 is a partially sectional view on a reduced scale showing one of the picking fingers flexed.

Referring now with particularity to the drawing:

In Fig. 4 I have shown a drum 1. This drum is provided on its periphery with a plurality of transversely extending channel members 2. Each channel member includes a base portion 3, sides 4 and 5, and top flanges 6 and 7 joined to the sides 4 and 5 respectively and in part overlying the base 3. Mounting bars designated generally as 8 are adapted to be received within the channel members 2, with each mounting bar supporting a plurality of picking fingers 9.

A picking finger 9 will first be described, followed by a description of the mounting bar 8 for holding the finger.

A finger 9 is preferably formed of flexible material, such as rubber or rubber composition, and each finger includes a base portion 10, provided with a bottom flange 11, the sides of the base above the flange being tapered, with the portion above the base having a stem or core 12, substantially in the form of a rhombic prism, see Fig. 5, the sides of the prism provided with a plurality of spaced segmental wings 13 and 14, the wings 13 of one group being substantially parallel, as are likewise the wings 14 of a second group, the cutting planes of oppositely disposed pairs of wings 13 and 14 being at an obtuse angle. In Fig. 1 one side of the rhombic prism core or stem is shown, and the segmental wing formation is duplicated for the opposite side of said prism, as illustrated in Figs. 2, 5 and 6. This construction gives the picking finger a substantially hourglass appearance in cross section, as shown in Fig. 5.

The mounting bar 8 comprises a channel casting having a top 15, sides 16 and 17, the top provided with a plurality of openings 18 bounded by marginal flanges 19. Each finger projects through an opening 18, with the flange 11 of the finger in engagement with the under surface of the top 15 of the mounting bar. As the base 10 of each finger is tapered, the openings 18 are preferably tapered so that the said base will fit tightly therein. The mounting bars are pushed inwardly of the channel members from one end thereof, until they are properly positioned on the drum, whereupon said mounting bars may be secured against movement by means of bolts designated generally as 20, which are passed through openings in the mounting bar and likewise in the base 3 of the channel members. This provides a convenient method for securing the mounting bars and likewise one which allows the mounting bars to be rapidly removed from the channel members for replacement of the fingers as they become worn.

The operation, uses and advantages of the invention just described are as follows:

It is intended that the drum 1 should be suitably supported on a shaft mounted in a cabinet of some form, said drum being driven by any convenient means, such as by a motor through the medium of a continuous belt passed over pulleys. Such a method of driving a device of the character of this invention is common in the art. When the drum is being rotated the fowl is pressed by the operator against the picking fingers 9. As the picking fingers engage the feathers, the fingers are flexed, as shown in Fig. 6, while ordinarily they stand upright or extend radially outwardly of the drum. The particular type of picking finger depicted in the drawing and described affords a substantially solid-sectioned finger, which, while flexible, has enough rigidity not to cause any barking of the skin of the fowl. The segmental wings are presented to the fowl in the position shown in Fig. 1. The arrangement of the segmental wings is such as to grip the feathers rather than merely rub the feathers, and this gripping action removes the feathers completely, including all pin feathers. The rhombic sectioned core carrying the segmental wings assures flexibility of the fingers. The finger in side elevation is tapered from top to bottom, as seen in Fig. 2, while in front elevation, that is viewing both wings 13 and 14, the finger is substantially straight-sided. Such a construction assures not only flexibilty but sufficient rigidity during the flexing of the finger to cause a rapid return of the finger to an upright position after such flexion. Thus the base portion 13 which appears tapered in Fig. 2, is shown as straight-sided in Fig. 1, a section of the base showing that the base is oval in form. Each finger is carried within the opening of a mounting bar, and as shown in Fig. 2 this mounting bar assures that the finger is rigidly carried therein at the base of the finger without any liability of slipping. Furthermore, such flexion as may occur in the finger occurs above the base 10 thereof, as illustrated in Fig. 6. The base of the finger therefore gives rigid support, in combination with the mounting bar, to the flexible portion of the finger. The flange 11 holds the finger in position against the under surface of the mounting bar and in such a manner that during actual operation of the drum the finger does not wobble when working upon a fowl. The mounting bar is easily removed from the channel member for replacement of the fingers as necessity arises.

Heretofore it has been the custom to provide fingers on a drum, which fingers are usually in the form of tubes, the periphery of which is grooved so that it appears to be screwthreaded. It has been found that the screwthreaded construction and the tubular nature of the finger results in a cutting of the finger in actual use, the screwthreaded portion rubs the feathers rather than gripping them, and the fingers do not flex properly, either flexing too much or not enough. The present invention overcomes the difficulties of the type of finger just mentioned.

I claim:

1. In a poultry picker, a picking finger of flexible material formed with a core portion and with wings of segmental circular form inclined at an angle less than 90° relative to the axis of the core.

2. In a poultry picker, a picking finger of flexible material formed with a core portion and with oppositely positioned pairs of spaced segmental wings.

3. A picking finger including a substantially rigid base and a flexible portion extending from said base, said flexible portion being formed with a core and spaced segmental wings projecting transversely from opposite sides of said core, said segmental wings being arranged in spaced pairs, the plane of the wings of each pair being at an obtuse angle to each other.

4. A picking finger, including a substantially rigid tapered base and a flexible portion extending from said base, said flexible portion having a rhombic sectioned core of uniform breadth, and spaced segmental wings transversely projecting from the sides of said core.

5. A picking finger, including a substantially rigid base and a flexible portion extending from said base, said flexible portion having a rhombic sectioned core of uniform breadth, and spaced segmental wings transversely projecting from the sides of said core, said segmental wings arranged in spaced pairs, the plane of each pair being at an obtuse angle.

JACOB PINE.

REFERENCES CITED

The following references are of record in the file of this patent:

UNITED STATES PATENTS

| Number | Name | Date |
|---|---|---|
| D. 149,086 | Norman | Mar. 23, 1948 |
| 1,002,468 | Strangman | Sept. 5, 1911 |
| 2,271,551 | Hoover | Feb. 3, 1942 |
| 2,337,201 | Johnson | Dec. 21, 1943 |
| 2,412,108 | Toti et al. | Dec. 3, 1946 |
| 2,413,712 | Jerome | Jan. 7, 1947 |